United States Patent [19]
Morishige et al.

[11] Patent Number: 5,817,425
[45] Date of Patent: Oct. 6, 1998

[54] LAYERED POLYAMIDE FILM AND METHOD FOR PRODUCING THE SAME

[75] Inventors: Chikao Morishige; Yoshinori Nakae; Mitsuru Kuwahara; Shinya Higashiura; Masashi Oki, all of Ohtsu; Toshiaki Takeuchi; Katsuaki Kuze, both of Inuyama, all of Japan

[73] Assignee: Toyo Boseki Kabushiki Kaisha, Osaka, Japan

[21] Appl. No.: 684,040

[22] Filed: Jul. 19, 1996

[30] Foreign Application Priority Data

Jul. 21, 1995 [JP] Japan ................................... 7-186086
Jul. 24, 1995 [JP] Japan ................................... 7-187572
Sep. 12, 1995 [JP] Japan ................................... 7-234004

[51] Int. Cl.$^6$ ................................................. B32B 27/34
[52] U.S. Cl. ....................... 428/475.2; 428/195; 428/201; 428/355 AC; 428/475.5; 428/480; 428/910; 427/207.1; 427/393.5; 264/171.13; 264/290.2
[58] Field of Search .............................. 428/475.2, 475.5, 428/480, 195, 355 AC, 910, 201; 427/207.1, 393.5; 264/171.13, 290.2

[56] References Cited

U.S. PATENT DOCUMENTS

| 3,760,034 | 9/1973 | Crintchfield et al. ................... 260/874 |
| 5,280,089 | 1/1994 | DeGraaf et al. ........................ 525/445 |
| 5,300,563 | 4/1994 | Kiang et al. ............................. 525/42 |
| 5,449,707 | 9/1995 | Higashiura et al. .................... 523/501 |

FOREIGN PATENT DOCUMENTS

| 58-124648A | 7/1983 | Japan . |
| 3-55302 | 8/1991 | Japan . |
| 3-67626 | 10/1991 | Japan . |

*Primary Examiner*—Paul J. Thibodeau
*Assistant Examiner*—D. Lawrence Tarazano
*Attorney, Agent, or Firm*—Leydig, Voit & Mayer, Ltd.

[57] ABSTRACT

A layered polyamide film includes a polyamide substrate; and an adhesiveness-improving layer provided on at least one surface of the polyamide substrate. The adhesiveness-improving layer includes a graft copolymer of a polyester and an acrylic polymer. Another layered polyamide film includes a printing ink layer, an adhesive layer, and a sealant layer sequentially laminated on the adhesiveness-improving layer. A method for producing such a layered polyamide film includes the step of applying an aqueous dispersion of the graft copolymer of the polyester and the acrylic polymer to at least one surface of the polyamide substrate to form an adhesiveness-improving layer and, if necessary, laminating a printing ink layer, an adhesive layer, and a sealant layer on adhesiveness-improving layer.

5 Claims, No Drawings

5,817,425

LAYERED POLYAMIDE FILM AND METHOD FOR PRODUCING THE SAME

BACKGROUND OF THE INVENTION

1. Field of the Invention:

The present invention relates to a polyamide film having an improved adhesiveness; and in particular, the present invention relates to a layered polyamide film including an adhesiveness-improving layer and thus having satisfactory adhesiveness with a sealant layer formed by a dry laminating process or an extrusion laminating process. The present invention further relates to a layered polyamide film including the adhesiveness-improving layer and the sealant layer formed thereabove.

2. Description of the Related Art:

Biaxially drawn polyamide films are used in a wide range of fields including packaging due to their satisfactory toughness, resistance against formation of pin holes, flex resistance, and heat resistance thereof. For packaging, for example, a biaxially drawn polyamide film having a sealant layer for heat-sealing is used. Such a polyamide film including a sealant layer is generally produced by providing an adhesive layer on a surface of a biaxially drawn polyamide film and then forming the sealant layer by a dry laminating process or an extrusion laminating process. The resultant polyamide film (i.e., polyamide film laminate) is useful for packaging food or medicines. If necessary, printing can be performed on the polyamide film laminate. Printing can be performed on a polyamide film before forming the adhesive layer and/or the sealant layer thereabove or can be performed on the surface of the polyamide film after the polyamide film laminate is completed. The resultant polyamide film laminate is formed into a bag. After the bag is filled with an object to be packaged, for example, flavoring such as "miso" or soy sauce, a moisture-containing food item such as soup or a heat-and-serve food or medicine, the opening of the bag is heat-sealed. The above-mentioned object is provided to consumers in this state.

Such a polyamide film laminate has a problem in that if water soaks between a plurality of layers of the laminate, the adhesiveness between the layers becomes significantly deteriorated. In the case where such a polyamide film laminate is used as a bag, deterioration in adhesiveness between the layers makes the bag susceptible to breakage. Furthermore, for example, in the case when such a bag is treated with boiling or retorting, deterioration in adhesiveness between the layers is more significant, and thus the bag is more easily broken.

Another problem with such a polyamide film laminate is that the adhesiveness between the layers is also deteriorated by printing ink. This problem becomes more common with the spread of multiple color printing which is used for emphasizing high quality in order to impress customers.

Such a polyamide film laminate has still another problem. In a structure in which an adhesive layer interposes the polyamide substrate and the sealant layer, when an adhesive which tends to be influenced by humidity, especially a water-curable adhesive is used, the adhesiveness between the layers significantly changes depending on the season in which the polyamide film laminate is produced.

SUMMARY OF THE INVENTION

According to one aspect of the invention, a layered polyamide film includes a polyamide substrate; and an adhesiveness-improving layer provided on at least one surface of the polyamide substrate. The adhesiveness-improving layer includes a graft copolymer of a polyester and an acrylic polymer.

In one embodiment of the invention, the layered polyamide film further includes a printing ink layer, an adhesive layer, and a sealant layer sequentially laminated on the adhesiveness-improving layer.

In another embodiment of the invention, the graft copolymer has a glass transition temperature of about 30° C. or less.

According to another aspect of the present invention, a method for producing a layered polyamide film including a polyamide substrate and an adhesiveness-improving layer provided on at least one surface of the polyamide substrate, the adhesiveness-improving layer including a graft copolymer of a polyester and an acrylic polymer includes the step of applying an aqueous dispersion of the graft copolymer of the polyester and the acrylic polymer to at least one surface of the polyamide substrate. The graft copolymer in the aqueous dispersion has a mean particle diameter of about 500 nm or less, and a half-width of a signal of a carbonyl carbon in the polyester chain in the particles of the graft copolymer in the aqueous dispersion measured using $^{13}$C-NMR spectrum is about 300 Hz or more.

Thus, the invention described herein makes possible the advantages of (1) providing a layered polyamide film including an adhesiveness-improving layer and thus having a sufficiently high adhesiveness with a layer to be formed thereon, especially a sealant layer to be formed by a dry laminating process, an extrusion laminating process or the like; (2) providing a layered polyamide film further including a sealant layer, and if necessary, an adhesive layer and a printing ink layer formed on a surface of the adhesiveness-improving layer of the above-described layered polyamide film and thus having a sufficiently high adhesiveness between the layers; (3) providing a layered polyamide film having a sealant layer and thus having a sufficiently high inter-layer adhesiveness to be resistant against delamination even when in an excessively humid environment or when treated with boiling or retorting, and thus is suitable for a package of, for example, a moisture-containing food and medicine; and (4) providing a method for producing a layered polyamide film including an adhesiveness-improving layer on at least one surface of a polyamide substrate and having a sufficiently high adhesiveness with a layer to be formed thereon.

These and other advantages of the present invention will become apparent to those skilled in the art upon reading and understanding the following detailed description.

DESCRIPTION OF THE PREFERRED EMBODIMENTS

In this specification, the term "grafting" refers to introducing a side chain polymer to a polymer backbone, the side chain polymer including a polymer which is different from the polymer included in the polymer backbone.

In this specification, the phrase "acrylic monomer" refers to an acrylic acid, a derivative thereof, a methacrylic acid, or a derivative thereof. A substance name described with parentheses, for example, "(meth)acrylate" refers both to acrylate and methacrylate.

In this specification, the phrase "acrylic polymer" refers to a polymer obtained by polymerization of a polymerizable monomer including at least one type of acrylic monomer.

In this specification, the phrase "aqueous solvent" refers to a solvent mainly containing water and further containing, if necessary, a hydrophilic organic solvent.

POLYAMIDE SUBSTRATE

Polyamides usable for a polyamide substrate of a layered polyamide film according to the present invention are, for example, nylon 6 obtained by using ε-caprolactam as a starting substance, a polyamide obtained from 3- or more-membered lactam or ω-amino acid, and a polyamide obtained by polycondensation of a dibasic acid and a diamine.

As the lactam, enantholactam, caprilolactam, laurolactam or the like can be used as well as ε-caprolactam.

As the ω-amino acid, 6-amino caproic acid, 7-amino heptanoic acid, 9-amino nonanoic acid, 11-amino undecanoic acid or the like can be used.

Usable dibasic acids include adipic acid, glutaric acid, pimelic acid, suberic acid, azelaic acid, sebacic acid, undecane dioic acid, dodecane dioic acid, hexacadene dionic acid, eicosane dionic acid, eicosadiene dioic acid, 2,2,4-trimethyladipic acid, terephthalic acid, isophthalic acid, 2,6-naphthalenedicarboxylic acid, and xylylenedicarboxylic acid.

Usable diamines include ethylenediamine, trimethylenediamine, tetramethylenediamine, hexamethylenediamine, pentamethylenediamine, undecamethylenediamine, 2,2,4-trimethylhexamethylenediamine, 2,4,4-trimethylhexamethylenediamine, cyclohexanediamine, bis-(4,4'-aminocyclohexyl)methane, and methaxylylenediamine.

As the polyamide which is a polymer or copolymer obtained by polycondensation of a dibasic acid and a diamine is exemplified in nylons 6, 7, 11, 12, 6.6, 6.9, 6.11, 6.12, 6T, 61, MXD6, 6/6.6, 6/12, 6/6T, 6/61, 6/MXD6 and the like.

Various additives can be contained in the polyamide substrate as long as the substrate functions as desired. As an additive, for example, an antioxidant, a light stabilizer, an antigelling agent, a lubricant, an anti-blocking agent, a pigment, an antistatic agent, and a surfactant can be used.

The polyamide substrate can be formed by a known film forming method such as a T-die method or an inflation method. The polyamide substrate used in the layered polyamide film according to the present invention can be a single-layer film, or a multiple-layer film formed by, for example, a co-extrusion laminating process.

GRAFT COPOLYMER

A graft copolymer included in the adhesiveness-improving layer of a layered polyamide film according to the present invention is a graft copolymer of a polyester and an acrylic polymer. In the graft copolymer, a polyester can be the polymer backbone and an acrylic polymer can be the side chain polymer; or an acrylic polymer can be the polymer backbone and a polyester can be the side chain polymer. Preferably, a polyester can be the polymer backbone and an acrylic polymer can be the side chain polymer.

The weight ratio of the polymer backbone and the side chain polymer of the graft copolymer is in the range of 5:95 to 95:5, and preferably in the range of 80:20 to 20:80.

The weight average molecular weight of the polymer backbone is as follows. In the case where a polyester is the polymer backbone, the weight average molecular weight is in the range of 5,000 to 200,000, and preferably in the range of 5,000 to 50,000. In the case where an acrylic polymer is the polymer backbone, the weight average molecular weight is in the range of 5,000 to 200,000, and preferably in the range of 5,000 to 100,000.

The weight average molecular weight of the side chain polymer is as follows. In the case where a polyester is the side chain, the weight average molecular weight is in the range of 500 to 50,000, and preferably in the range of 5,000 to 30,000. In the case where an acrylic polymer is the side chain polymer, the weight average molecular weight is in the range of 500 to 50,000, and preferably in the range of 4,000 to 50,000.

The glass transition temperature of the graft copolymer is preferably about 30° C. or less, and more preferably about 10° C. or less. A graft copolymer having a glass transition temperature of about 30° C. or less is advantageous in that a bag formed of a layered polymer film including an adhesiveness-improving layer formed of such a graft copolymer and a sealant layer, etc. formed on the adhesiveness-improving layer is less susceptible to breakage when treated with boiling.

By including such a graft copolymer in the adhesiveness-improving layer, the adhesiveness between the adhesiveness-improving layer and the polyamide substrate also between the adhesiveness-improving layer and a layer formed above, for example, a sealant layer is significantly improved. Thus, the layered polyamide film according to the present invention has a significantly improved resistance against treatment with boiling or retorting.

Preparation of the Graft Copolymer

The above-described graft copolymer is prepared by, for example, one of the following methods. The present invention is not limited to such methods. Polyesters and acrylic polymers usable for forming the graft copolymer will be described later.

(Method 1)

On polyester molecules, an initiation site of radical polymerization, cationic polymerization or anionic polymerization is generated. At the initiation site, a monomer including at least one type of acrylic monomer is graft-polymerized.

By this method, a graft copolymer having a polyester as the polymer backbone and an acrylic polymer as the side chain polymer is prepared.

In particular, this method can be performed by, for example, one of the following methods:

(A) Radical polymerization:

On polyester molecules, a radical is generated by light, heat or radiation, and then a monomer including at least one type of acrylic monomer is graft-polymerized.

(B) Cationic polymerization:

On polyester molecules, a cation site is generated using a catalyst such as $AlCl_3$ or $TiCl_4$, and then a monomer including at least one type of acrylic monomer is graft-polymerized.

(C) Anionic polymerization:

On polyester molecules, an anion site is generated using metal sodium, metal lithium or the like, and then a monomer including at least one type of acrylic monomer is graft-polymerized.

(Method 2)

A polyester having a polymerizable unsaturated bond in a backbone, at a terminal of the backbone, or in a side chain is prepared, and a monomer including at least one type of acrylic monomer is graft-polymerized with the polyester.

By this method, a graft copolymer having a polyester as the polymer backbone and an acrylic polymer as the side chain is prepared.

A polyester having a polymerizable unsaturated bond (in particular, a radical-polymerizable unsaturated bond) in the backbone can be prepared by using a dicarboxylic acid having a polymerizable unsaturated bond as one component of a carboxylic acid used for preparing the polyester.

A polyester having a polymerizable unsaturated bond at a terminal of the backbone can be prepared by reacting a polymerizable monomer having a polymerizable unsaturated bond and a functional group (a carboxyl group, an acid anhydride group, an acid chloride group, an epoxy group, an isocyanate group, etc.) which can react with a hydroxyl group, with a hydroxy terminal of the polyester. Alternatively, such a polyester can be prepared by reacting a polymerizable monomer having a polymerizable unsaturated bond and a functional group (a hydroxyl group, an amino group, an isocyanate group, etc.) which can react with a carboxyl group, with a carboxy terminal of the polyester.

A polyester having a polymerizable unsaturated bond in the side chain can be prepared by reacting a carboxyl group or a hydroxyl group existing in the polyester side chain, with a polymerizable monomer having a polymerizable unsaturated bond and a functional group which can react with the carboxyl or hydroxyl group.

(Method 3)

A polyester having a functional group in the side chain is directly reacted with an acrylic polymer having a group which can react with the functional group at a terminal of the side chain; or an acrylic polymer having a functional group in the side chain is directly reacted with a polyester having a group which can react with the functional group at a terminal thereof.

By the former method, a graft copolymer having a polyester as the polymer backbone and an acrylic polymer as the side chain polymer is prepared. By the latter method, a graft copolymer having an acrylic polymer as the polymer backbone and a polyester as the side chain polymer is prepared.

As the functional group included in the polyester side chain, a hydroxyl group, a carboxyl group or the like can be used. As the group, included at the terminal of the acrylic polymer, which can react with the hydroxyl group, a carboxyl group, an acid anhydride group, an acid chloride group, an epoxy group, an isocyanate group, or the like can be used. As the group, included at the terminal of the acrylic polymer, which can react with the carboxyl group, an amino group, an isocyanate group, or the like can be used. An acrylic polymer having such a functional group at the terminal thereof is known as a macromer in the art and can be prepared by a known method.

As the functional group included in the acrylic polymer side chain, a hydroxyl group, a carboxyl group, an acid chloride group, an acid anhydride group, an epoxy group, an amino group, an isocyanate group, or the like can be used. As the group, included at the terminal of the polyester, which can react with such a functional group, a hydroxyl group, a carboxyl group, or the like can be used.

(Method 4)

A polyester having a functional group in the side chain is reacted with an acrylic polymer having a functional group at a terminal thereof using a bifunctional coupling agent which can react with such functional groups; or an acrylic polymer having a functional group in the side chain is reacted with a polyester having a functional group at a terminal thereof using a bifunctional coupling agent. which can react with such functional groups.

By the former method, a graft copolymer having a polyester as the polymer backbone and an acrylic polymer as the side chain polymer is prepared. By the latter method, a graft copolymer having an acrylic polymer as the polymer backbone and a polyester as the side chain polymer is prepared.

As the functional group included in the polyester, any of the functional groups listed in method 3 can be used. As the functional group included in the acrylic polymer also, any of the functional groups listed in method 3 can be used. As the bifunctional coupling agent, any compound including at least two of any type of the above-mentioned functional groups in one molecule can be used. For example, p,p'-diphenylmethane diisocyanate or toluene diisocyanate can be used.

In the case where a graft copolymer which is soluble or dispersible in an organic solvent is desired, such a graft copolymer can be obtained in the following manner. In preparing a graft copolymer having an acrylic polymer as the side chain polymer by any of methods 1 through 4, the acrylic side chain polymer is formed by using a monomer, such as an alkyl(meth)acrylate, having an alicyclic group or a long-chain alkyl group (for example, 2-ethylhexyl, cyclohexyl, lauryl, and stearyl). In preparing a graft copolymer having a polyester as the side chain polymer by method 3 or 4, the polyester side chain polymer is formed by grafting a hydrophobic polyester.

In the case where a graft copolymer which is soluble or dispersible in an aqueous solvent is desired, such a graft copolymer can be obtained in the following manner. In preparing a graft copolymer having an acrylic polymer as the side chain polymer by any of methods 1 through 4, the acrylic side chain polymer is formed by using a polymerizable monomer having a hydrophilic group or a group which can be converted to a hydrophilic group later in the range of 5 to 95 wt. %, preferably in the range of 10 to 90 wt. %, and more preferably in the range of 40 to 80 wt. % with respect to the entire amount of the polymerizable monomer used for preparing the graft copolymer. In preparing a graft copolymer having a polyester as the side chain polymer by method 3 or 4, the polyester side chain polymer is formed by grafting a hydrophilic polyester.

Polyester Included in the Graft Copolymer

A polyester used for preparing the graft copolymer is preferably a saturated or unsaturated polyester synthesized using at least a dicarboxylic acid and a diol. A desired type of polyester used for a starting substance for the preparation of a graft copolymer is prepared in accordance with the kind of the graft copolymer and the method for preparing the graft copolymer. A single type of polyester or a combination of two or more types of polyester can be used.

In preparing the graft copolymer using polyester as the polymer backbone in one of methods 1 through 4, an aromatic dicarboxylic acid, and an aliphatic dicarboxylic acid and/or an alicyclic dicarboxylic acid can be used as the dicarboxylic acid. If necessary, for example, in method 2, a dicarboxylic acid having a polymerizable unsaturated double bond is used as a part of the dicarboxylic acid.

The aromatic carboxylic acid can be contained in the range of 30 to 99.5 mol % and preferably in the range of 40 to 99.5 mol % with respect to the entire amount of the carboxylic acid included in the graft copolymer; the aliphatic and/or alicyclic carboxylic acid can be contained in the range of 0 to 70 mol % and preferably in the range of 0 to 60 mol % with respect to the entire amount of the carboxylic acid included in the graft copolymer.

In the case where a dicarboxylic acid having a polymerizable unsaturated double bond is used as a part of the dicarboxylic acid, the polymerizable unsaturated double bond is introduced into the polyester chain. The polymerizable unsaturated double bond can be a graft polymerization initiating site. The dicarboxylic acid having a polymerizable unsaturated double bond can be contained in the range of 0.5 to 10 mol %, preferably in the range of 2 to 7 mol %, and more preferably in the range of 3 to 6 mol % with respect to the entire amount of the polycarboxylic acid (i.e., dicarboxylic acid and tri- or more-functional carboxylic acid described below added thereto if necessary) included in the graft copolymer. In the case where such a dicarboxylic acid is contained at less than 0.5 mol %, the polymerizable monomer is less efficiently grafted into a side chain polymer. In such a case, when the resultant graft copolymer is dispersed in an aqueous solvent as described later, the particle diameter of the graft copolymer tends to increase, resulting in lower dispersion stability. In the case where the dicarboxylic acid having a polymerizable unsaturated double bond is used for preparing the graft copolymer at more than 10 mol % with respect to the entire amount of the polycarboxylic acid, the viscosity of the reaction mixture rises in a latter stage of grafting, causing less uniform proceeding of the reaction.

Usable aromatic dicarboxylic acids include terephthalic acid, isophthalic acid, orthophthalic acid, naphthalenedicarboxylic acid, and biphenyldicarboxylic acid. If necessary, an ionic monomer such as sodium 5-sulfoisophthalate can be used.

Usable aliphatic dicarboxylic acids include succinic acid, adipic acid, azelaic acid, sebacic acid, dodecane dioic acid, dimer acid, and an acid anhydride thereof.

Usable alicyclic dicarboxylic acids include 1,4-cyclohexanedicarboxylic acid, 1,3-cyclohexanedicarboxylic acid, 1,2-cyclohexanedicarboxylic acid, and an acid anhydride thereof.

The dicarboxylic acid having a polymerizable unsaturated double bond can be of two types: $\alpha, \beta$-unsaturated aliphatic dicarboxylic acid and alicyclic dicarboxylic acid including their acid anhydrides. Usable $\alpha, \beta$-unsaturated aliphatic dicarboxylic acids include fumaric acid, maleic acid, maleic anhydride, itaconic acid, and citraconic acid. Usable alicyclic dicarboxylic acids include 2,5-norbornenedicarboxylic acid (endo-bicyclo-(2,2,1)-5-heptene-2,3-dicarboxylic acid), 2,5-norbornenedicarboxylic anhydride, and tetrahydro phthalic anhydride. Among these acids, fumaric acid, maleic acid, 2,5-norbornenedicarboxylic acid and their anhydrides are preferable.

A diol used for preparing the polyester is at least one of aliphatic glycol having 2 to 10 carbons, alicyclic glycol having 6 to 12 carbons, and glycol having an ether bond.

Usable aliphatic glycols having 2 to 10 carbons include ethyleneglycol, 1,2-propyleneglycol, 1,3-propanediol, 1,4-butanediol, 1,5-pentanediol, neopentylglycol, 1,6-hexanediol, 3-methyl-1,5-pentanediol, 1,9-nonanediol, and 2-ethyl-2-butylpropanediol.

As the alicyclic glycol having 6 to 12 carbons, 1,4-cyclohexanedimethanol or the like can be used.

Usable glycols having an ether bond include diethyleneglycol, triethyleneglycol, and dipropyleneglycol. Alternatively, glycol obtained by adding one to several mols of ethylene oxide or propylene oxide to the two phenolic hydroxyl groups of bisphenol, for example, 2,2-bis(4-hydroxyethoxyphenyl)propane can be used. If necessary, polyglycol such as polyethyleneglycol, polypropyleneglycol, or polytetramethyleneglycol can be used.

In addition to the above-described dicarboxylic acid and diol, a tri- or more-functional polycarboxylic acid and/or a polyol can be used. Especially in the case where polyester is used as the polymer backbone in methods 2 through 4, a tri- or more-functional polycarboxylic acid and/or a polyol can be advantageously used. Since a free hydroxyl or carboxyl group is contained in the polyester chain at a higher ratio in such a case, the side chain polymer can be grafted more effectively.

Usable tri- or more-functional polycarboxylic acids include trimellitic acid, an anhydride thereof, pyromellitic acid, an anhydride thereof, benzophenonetetracarbolyxic acid, an anhydride thereof, trimesic acid, ethyleneglycol-bis (anhydrotrimellitate), and glycerol-tris(anhydrotrimellitate).

Usable tri- or more-functional polyols include glycerol, trimethylolethane, trimethylolpropane, and pentaerythritol.

The tri- or more-functional polycarboxylic acid can be contained in the range of 0 to 5 mol % and preferably in the range of 0 to 3 mol % with respect to the entire amount of the polycarboxylic acid including a dicarboxylic acid. The tri- or more-functional polyol can be contained in the range of 0 to 5 mol % and preferably in the range of 0 to 3 mol % with respect to the entire amount of the polyol including diol.

In preparing the graft copolymer using a polyester as the side chain polymer by method 3 or 4, any one of the polyesters and their starting substances which are substantially the same type of polyester used in the preparation of a graft copolymer having polyester as a backbone can be used.

Acrylic Polymer Included in the Graft Copolymer

As described above, an acrylic polymer is obtained by polymerization of a polymerizable monomer including at least one acrylic monomer. The acrylic polymer can be a homopolymer or a copolymer of an acrylic monomer and another type of polymerizable monomer.

Usable acrylic monomers include alkyl esters of acrylic or methacrylic acid such as methyl (meth)acrylate ethyl (meth) acrylate, isopropyl (meth)acrylate, n-butyl (meth)acrylate, t-butyl (meth)acrylate, 2-ethylhexyl (meth)acrylate, cyclohexyl (meth)acrylate, phenyl (meth)-acrylate, benzyl (meth) acrylate, phenyl ethyl (meth)acrylate, lauryl (meth)acrylate, and stearyl (meth)acrylate; acrylic or methacrylic acid derivatives having an amide group such as (meth) acrylamide, N-methyl(meth)acrylamide, N-methylol(meth) acrylamide, N,N-dimethylol(meth)acrylamide, N-methoxymethyl(meth)acrylamide, and N-phenyl(meth)acrylamide; acrylic or methacrylic acid derivatives having an amino group such as N,N-diethylaminoethyl(meth)acrylate. These monomers can be used independently or as a combination of two or more.

Other polymerizable monomers which can be used in combination of the acrylic monomer include nitriles such as acrylonitrile and methacrylonitrile; vinyl esters such as vinyl acetate, vinyl propionate and vinyl benzoate; vinyl ethers such as vinyl methyl ether, vinyl ethyl ether and vinyl isobutyl ether; vinyl ketones such as vinyl methyl ketone, vinyl hexyl ketone and methyl isopropenyl ketone; N-vinyl compounds such as N-vinylpyrrole, N-vinylcarbazole, N-vinylindole and N-vinylpyrrolidone; vinyl halides such as vinyl chloride, vinylidene chloride, vinyl bromide and vinyl fluoride; aromatic vinyl compounds such as styrene, $\alpha$-methylstyrene, t-butylstyrene, vinyltoluene, and vinylnaphthalenes. These monomers can be used independently or as a combination of two or more.

An acrylic polymer used as the polymer backbone for preparing a graft copolymer by method 3 or 4 can be a homopolymer or a copolymer of a polymerizable monomer including at least one type of monomer having a functional group which can react with a functional group (for example, a hydroxyl group or a carboxyl group) existing at a terminal of the polyester chain which will form a side chain.

Using a monomer having a functional group which can react with a functional group, for example, a hydroxyl group or carboxyl group existing at the terminal of the polyester chain is advantageous in that the functional group which can react with the functional group existing at the terminal of the polyester chain is introduced to the acrylic polymer chain. Such functional groups can be a site where the side chain polymer is grafted.

Usable polymerizable monomers having a functional group which can react with a hydroxyl group at a terminal of the polyester chain include acrylic acid, methacrylic acid, glycidyl acrylate, glycidyl methacrylate, allyl glycidyl ether, acryloyl chloride, methacryloyl chloride, vinyl isocyanate, allyl isocyanate, methacryloyl isocyanate, and vinyl trialkoxy silanes.

Usable polymerizable monomers having a functional group which can react with a carboxyl group at a terminal of the polyester chain include acrylic acid derivatives and methacrylic acid derivatives both including a hydroxyl group, for example, 2-hydroxyethyl (meth)acrylate, and 2-hydroxypropyl (meth)acrylate. Other monomers such as vinyl isocyanate, allyl isocyanate, and methacryloyl isocyanate can also be used.

In preparing a graft copolymer having an acrylic polymer as the side chain polymer by any of methods 1 through 4, the acrylic side chain polymer can be formed in the following manner.

In the case where the polyester used as the polymer backbone has a polymerizable unsaturated double bond in a molecule thereof (method 2), a polymerizable monomer including at least one type of acrylic monomer can be directly graft-polymerized to the polymerizable unsaturated double bond in the polyester molecule. Thus, the acrylic side chain polymer is formed.

In the case where the polyester used as the polymer backbone does not have a polymerizable unsaturated double bond in a molecule thereof (method 3 or 4), an acrylic polymer having a functional group which can react with a hydroxyl or carboxyl group at a terminal of the polymer chain is reacted with the hydroxyl or carboxyl group in the molecule of the polyester used as the polymer backbone. Thus, the acrylic side chain polymer is formed.

As described in the section of "Preparation of the graft copolymer", usable polymerizable monomers having a hydrophilic group or a group which can be converted to a hydrophilic group later, which can be used in preparing a graft copolymer soluble or dispersible in an aqueous solvent include monomers having a hydroxyl group such as 2-hydroxyethyl(meth)acrylate and 2-hydroxypropyl(meth) acrylate; monomers having a carboxyl group or salt thereof, such as acrylic acid, methacrylic acid, maleic acid, fumaric acid, itaconic acid, citraconic acid, maleic acid monoalkylester, fumaric acid monoalkylester, itaconic acid monoalkylester, citraconic acid monoalkylester and salts thereof (e.g., sodium salt, potassium salt and ammonium salt); monomers including a sulfonic acid group, such as styrene sulfonic acid, vinyl sulfonic acid, and salts thereof (for example, sodium salt, potassium salt, and ammonium salt); acid anhydride monomers such as maleic anhydride and itaconic anhydride; monomers having a phosphorus containing acid group or salts thereof, such as 2-(methacryloyloxy)ethylphosphonic acid and salts thereof (e.g., sodium salt, potassium salt and ammonium salt); monomers having quaternary ammonium group such as [2-(methacryloyloxy)ethyl]trimethylammonium chloride.

Polymerization Initiator and Additive Used for Preparing Graft Copolymer

As a polymerization initiator used for graft polymerization according to the present invention, an organic peroxide or an organic azo compound known to those skilled in the art can be used. As the organic peroxide, benzoyl peroxide or t-butyl-peroxypivalate can be used. As the organic azo compound, 2,2'-azobisisobutylonitrile, 2,2'-azobis(2,4-dimethylvaleronitrile) or the like can be used. The initiator is used in the range of 0.2 wt. % or more, preferably in the range of 0.2 to 2 wt. %, and more preferably in the range of 0.5 to 1 wt. % with respect to the entire amount of the polymerizable monomer used to prepare the graft copolymer.

In addition to the initiator, a chain transfer agent for adjusting the length of the side chain polymer, for example, octylmercaptan, mercaptoethanol, or 3-t-butyl-4-hydroxyanisole can be used if necessary. Such a chain transfer agent is preferably added in the range of 0 to 5 wt. % with respect to the entire amount of the polymerizable monomer used for preparing the graft copolymer.

Dispersibility of the Graft Copolymer

The graft copolymer is applied to a polyamide substrate in the form of an organic solvent solution or dispersion, or an aqueous solvent solution or dispersion as described later, thus forming an adhesiveness-improving layer. The graft copolymer used in the present invention has superior dispersibility. Accordingly, an emulsifier or an organic cosolvent, which is often used conventionally, are not necessary in order to disperse the graft copolymer in the solvent.

The dispersibility of the graft copolymer can depend on a mean particle diameter thereof in the dispersion. In the case where a dispersion is formed by dispersing the graft copolymer having a solid content in the range of 1 to 50 wt. % in an organic solvent or an aqueous solvent, the mean particle diameter of the graft copolymer in the dispersion measured by a laser light scattering method is 500 nm or less, preferably in the range of 10 nm to 500 nm, and more preferably in the range of 10 nm to 300 nm. If the mean particle diameter exceeds 500 nm, the particles tends not to be stably dispersed. Accordingly, it is difficult to obtain an adhesiveness-improving layer with sufficiently high performance.

The dispersibility of the graft copolymer can be evaluated using the $^{13}$C-NMR spectrum thereof in the dispersion. It is generally known that, in the $^{13}$C-NMR, the chemical shift, half-width, and relaxation time varies in accordance with the environment in which the carbon atom to be measured is located. For example, the signal of the carbonyl carbon of the graft copolymer dissolved in heavy water is located at a position in the range of 170 ppm to 200 ppm, and the half-width thereof is about 300 Hz or less. The signal of a graft copolymer which is not dissolved in heavy water is located at a position in the range of 170 ppm to 200 ppm, and the half-width thereof is about 300 Hz or more.

According to the present invention, the graft copolymer is dispersed in an aqueous solvent having a solid content in the range of 1 to 50 wt. %, and the $^{13}$C-NMR analysis of the graft copolymer dispersed in the aqueous solvent is conducted (125 MHz, 25° C., solvent: heavy water, half-width of the signal of DSS (dimethylsilapentanesulfonic acid): 5

Hz or less). The obtained data is subjected to Fourier transformation without a weight function to obtain a spectrum. The half-width of the signal of the carbonyl carbon derived from the polymer backbone is preferably 300 Hz or more, and the half-width of the signal of the carbonyl carbon derived from the side chain polymer is preferably 150 Hz or less. When the polymer backbone and the side chain polymer of the graft copolymer dispersed in the aqueous solvent exhibit such half-widths, the graft copolymer has a core-shell structure in the aqueous solvent, in which the polymer backbone acts as the core. Due to such a core-shell structure of the polymer particles in the solvent, the dispersibility of the particles is stabilized. Accordingly, it is not necessary to use an often conventionally employed emulsifier or organic cosolvent. As a result, the resistance of the layered polyamide film against delamination, especially delamination caused by boiling or retorting, between the polyamide substrate and the sealant layer with the adhesiveness-improving layer, the printing ink layer, and the adhesive layer in between is significantly improved.

LAYERED POLYAMIDE FILM

A layered polyamide film according to the present invention includes an adhesiveness-improving layer which includes the above-described graft copolymer formed on at least one surface of the polyamide substrate. In a preferable embodiment, the layered polyamide film according to the present invention further includes an adhesive layer and a sealant layer on the adhesiveness-improving layer. In a more preferable embodiment, the layered polyamide film further includes a printing ink layer, an adhesive layer, and a sealant layer on the adhesiveness-improving layer. The adhesiveness-improving layer including the graft copolymer can improve the adhesiveness between the polyamide substrate and the sealant layer with the adhesiveness-improving layer, the printing ink layer and the adhesive layer in between.

ADHESIVENESS-IMPROVING LAYER

The adhesiveness-improving layer provided on at least one surface of the polyamide substrate includes the graft copolymer. In the adhesiveness-improving layer, the graft copolymer can be cured by a cross-linking agent. Curing the graft copolymer by a cross-linking agent is advantageous in further improving the moisture resistance of the adhesiveness-improving layer. The adhesiveness-improving layer can include an additive such as an antistatic agent, an inorganic lubricant, or an organic lubricant as long as the adhesiveness-improving layer maintains the desired function and effect thereof. The adhesiveness-improving layer can be formed by applying a coating liquid on at least one surface of the polyamide substrate, the coating liquid including the graft copolymer, and as necessary, a cross-linking agent and/or an additive.

The cross-linking agent can be any low-molecular weight, polyfunctional compound or a curing resin. Usable cross-linking agents include phenol-formaldehyde resins, which are condensation products of alkylated phenols or cresols and formaldehyde; amino resins such as addition-reaction products of urea, melamine or benzoguanamine and formaldehyde, or such as alkylether compounds containing such addition-reaction products and alcohols having 1 to 6 carbon atoms; polyfunctional epoxy compounds; polyfunctional isocyanate compounds; blocked isocyanate compounds; polyfunctional aziridine compounds; and oxazoline compounds.

Usable phenol-formaldehyde resins include, for example, a condensation product of formaldehyde with phenols such as alkyl (e.g., methyl, ethyl, propyl, isopropyl or butyl) phenol, p-tert-amylphenol, 4,4'-sec-butylidenephenol, p-tert-butylphenol, o-, m-, or p-cresol, p-cyclohexylphenol, 4,4'-isopropylidenephenol, p-nonylphenol, p-octylphenol, 3-pentadecylphenol, phenol, phenyl-o-cresol, p-phenylphenol, and xylenol.

Usable amino resins include, for example, methoxylated methylolurea, methoxylated methylol-N,N-ethyleneurea, methoxylated methyloldicyanodiamide, methoxylated methylolmelamine, methoxylated methylolbezoguanamine, methylolbezoguanamine, butoxylated methylolmelamine, and butoxylated methylolbezoguanamine. Preferably, methoxylated methylolmelamine, butoxylated methylolmelamine, methylolbezoguanamine, and the like can be used.

Usable polyfunctional epoxy compounds include, for example, diglycidyl ether of bisphenol A and oligomers thereof, diglycidyl ether of hydrogenated bisphenol A and oligomers thereof, orthophthalic acid diglycidyl ester, isophthalic acid diglycidyl ester, terephthalic acid diglycidyl ester, p-oxybenzoic acid diglycidyl ester, tetrahydrophthalic acid diglycidyl ester, hexahydrophthalic acid diglycidyl ester, succinic acid diglycidyl ester, adipic acid diglycidyl ester, sebacic acid diglycidyl ester, ethyleneglycol diglycidyl ether, propyleneglycol diglycidyl ether, 1,4-butanediol diglycidyl ether, 1,6-hexanediol diglycidyl ether, polyalkyleneglycol diglycidyl ethers, trimellitic acid triglycidyl ester, triglycidyl isocianurate, 1,4-diglycidyloxybenzene, diglycidylpropyleneurea, glycerol triglycidyl ether, trimethylolpropane triglycidyl ether, pentaerythritol triglycidyl ether, and triglycidyl ether of glycerol alkylene oxide adduct.

Usable polyfunctional isocyanate compounds include low- and high-molecular weight aromatic or aliphatic diisocyanates; and low- and high-molecular weight aromatic or aliphatic three- or more-functional polyisocyanates. Usable diisocyanates include tetramethylene diisocyanate, hexamethylene diisocyanate, toluene diisocyanate, diphenylmethane diisocyanate, hydrogenated diphenylmethane diisocyanate, xylylene diisocyanate, hydrogenated xylylene diisocyanate, isophorone diisocyanate, and trimers of such isocyanate compounds. The usable polyfunctional isocyanate compounds further includes compounds containing isocyanate groups at their molecular terminals obtained by reacting an excessive amount of any of such isocyanate compounds and any of low-molecular weight active hydrogen compounds such as ethyleneglycol, propyleneglycol, trimethylolpropane, glycerol, sorbitol, ethylenediamine, monoethanolamine, diethanolamine, triethanolamine, or any of high-molecular weight active hydrogen compounds such as polyesterpolyols, polyetherpolyols, and polyamides.

Any of the above-mentioned blocked isocyanate compounds can be prepared by addition reaction of any of the above-described polyfunctional isocyanate compounds and a blocking agent using a known method. Usable blocking agents for preparing a blocked isocyanate include phenols such as phenol, cresol, xylenol, resorcinol, nitrophenol, and chrolophenol; thiophenols such as thiophenol and methylthiophenol; oximes such as acetoxime, methyl ethyl ketoxime, and cyclohexanone oxime; alcohols such as methanol, ethanol, propanol, and butanol; halogenated alcohols, such as ethylenechlorohydrin and 1, 3-dichloro-2-propanol; tertiary alcohols such as t-butanol and t-pentanol; lactams such as ε-caprolactam, δ-valerolactam, ν-butyrolactam, and β-propyllactam; aromatic amines, imides, active methylene compounds such as acetylacetone, acetoacetates, and ethyl malonate; mercaptans; imines; ureas; diaryl compounds, and sodium bisulfite.

The above-listed cross-linking agents can be used independently or as a combination of two or more. The cross-linking agent is preferably used in the range of 5 parts to 40 parts with respect to 100 parts of the graft copolymer. The cross-linking agent can be used in combination with a curing promoter generally used.

The cross-linking agent is mixed with the graft copolymer so as to form the adhesiveness-improving layer as follows: (1) a water soluble cross-linking agent is directly dissolved or dispersed in an aqueous solvent solution or dispersion of the graft copolymer; or (2) an oil-soluble cross-linking agent is added to the reaction mixture, including the graft copolymer, which is obtained when the graft copolymer is prepared. One of these methods can be appropriately selected in accordance with the type and property of the cross-linking agent.

As described above, the adhesiveness-improving layer can be formed by applying a coating liquid on at least one surface of the polyamide substrate. The coating liquid includes the graft copolymer, and as necessary, a cross-linking agent and/or additive.

As described above, the coating liquid is an organic solvent solution or dispersion of the graft copolymer, or an aqueous solvent solution or dispersion of the graft copolymer. The aqueous solvent solution or dispersion is preferable in terms of environmental conservation. The aqueous dispersion is more preferable in terms of performance of the resultant layered polyamide film. The solid content of the graft copolymer in the organic solvent solution or the aqueous solvent solution is in the range of 1 to 50 wt. % and preferably in the range of 3 to 30 wt. %.

The mean particle diameter of the graft copolymer dispersed in the organic solvent solution or aqueous solvent solution described above measured by a laser light scattering method is 500 nm or less, preferably in the range of 10 nm to 500 nm, and more preferably in the range of 10 nm to 300 nm. If the mean particle diameter exceeds 500 nm, the particles tend not to be stably dispersed.

In the case where the graft copolymer dispersed in an aqueous solvent is used as the coating liquid, the following dispersibility is preferable. In the spectrum obtained by conducting a $^{13}$C-NMR analysis of the graft copolymer dispersed in the aqueous solvent (125 MHz, 25° C., solvent: heavy water, half-width of the signal of DSS: 5 Hz or less) and performing Fourier transformation of the measured value without a weight function, the half-width of the signal of the carbonyl carbon derived from the polymer backbone is 300 Hz or more, and the half-width of the signal of the carbonyl carbon derived from the side chain polymer is 150 Hz or less.

The coating liquid including the graft copolymer is applied to the polyamide substrate by a known application method such as a gravure coating method, a reverse roll coating method, a die coating method, a bar coating method, or a dip coating method.

The coating amount of the coating liquid is, when measured as a solid, in the range of 0.01 to 1 $g/m^2$ and preferably in the range of 0.02 to 0.5 $g/m^2$. If the coating amount is less than 0.01 $g/m^2$, a sufficiently high adhesiveness cannot be achieved between the resultant adhesiveness-improving layer and layers adjacent thereto. If the coating amount exceeds 1 $g/m^2$, generation of blocking provides a problem in practical use.

After the coating liquid is applied to the polyamide substrate, the substrate coated with the coating liquid is treated in the following manner in order to complete the adhesiveness-improving layer. In the case where a biaxially drawn polyamide substrate is used, the substrate coated with the coating liquid is dried and thermally fixed. In the case where an undrawn or uniaxially drawn polyamide substrate is used, the substrate coated with the coating liquid is dried and then, if necessary, drawn in uniaxially or biaxially and thermally fixed. Thus, the adhesiveness-improving layer is completed. When the biaxially drawn polyamide substrate coated with the coating liquid is dried and thermally fixed at a temperature of about 150° C. or more and preferably of about 200° C. or more, the resultant film (i.e., the adhesiveness-improving layer) is strengthened, and thus the adhesiveness thereof with the polyamide substrate is improved. When the undrawn or uniaxially drawn polyamide substrate is dried before further drawing, it is preferable to perform the drying to control the water content of the substrate with the coating liquid to be in the range of 0.1 to 2%, in order to maintain the resultant film to be drawn relatively easily after being dried. After being drawn, the film is dried and thermally fixed at a temperature of about 200° C. or more. Thus, the film on the substrate (i.e., the adhesiveness-improving layer) is strengthened, and the adhesiveness thereof with the polyamide substrate is improved.

PRINTING INK LAYER

The layered polyamide film according to the present invention preferably includes a printing ink layer on the adhesiveness-improving layer which is formed on the polyamide substrate. As the printing ink used for forming the printing ink layer, ink including a cellulose derivative as the binder or gravure ink including a synthetic resin as the binder can be mainly used. In the case where moisture resistance is especially required, ink including, as a binder, vinyl chloride, polyester, polyether, polyol or the like having a hydroxyl group at a terminal of its polymer chain can be used in the state of being mixed with a curing agent. The printing ink layer can be formed on the entire surface of the adhesiveness-improving layer, or on a partial area of the surface of the adhesiveness-improving layer which is patterned as desired.

ADHESIVE LAYER

The layered polyamide film according to the present invention preferably includes an adhesive layer on the printing ink layer. The adhesive layer usually has a thickness of 0.1 to 10 μm.

In the case where a sealant layer to be formed on the adhesive layer is laminated by an extrusion laminating process, an adhesive used for the adhesive layer is preferably an isocyanate-type adhesive. There are two types of isocyanate-type adhesives: a one-component system adhesive and a two-component system adhesive. As the one-component system adhesive, for example, polyurethane or a polyurethane prepolymer can be used, both of which are obtained by reacting a diisocyanate with a polyhydric alcohol and have an isocyanate group at a terminal of the molecule. As the two-component system adhesive, for example, an adhesive obtained by mixing, immediately before use, a polyisocyanate and a polyol or a polyurethane prepolymer which has a hydroxyl group at a terminal of the molecule can be used.

In the case where a sealant to be formed on the adhesive layer is laminated by a dry laminating process, an adhesive used for the adhesive layer can be a known adhesive such as vinyl, acrylic, polyamide, epoxy, or urethane type adhesive. Among these adhesives, a two-component system polyurethane adhesive, which is a combination of polyisocyanate and polyol, is preferable.

The adhesive layer can be formed by applying any of the above-mentioned adhesives to the printing ink layer using a method known to those skilled in the art.

SEALANT LAYER

The layered polyamide film according to the present invention preferably includes a sealant layer on the adhesive layer. The sealant layer usually has a thickness of 20 μm to 100 μm. The sealant layer can be formed by extrusion lamination or dry lamination of a synthetic resin such as a low-density polyethylene (LDPE), ethylene-vinyl acetate copolymer (EVA), an ionomer, or polypropylene (PP).

EXAMPLES

Hereinafter, the present invention will be described by way of illustrative examples. In the examples, the unit "parts" indicates parts by weight, and the unit "%" indicates the percent by weight. The following parameters were measured as follows.

(1) Weight average molecular weight

First, 0.03 g of a polymer is dissolved in 10 ml of tetrahydrofuran, and then the weight average molecular weight of the polymer is measured by a GPC-LALLS (low-angle laser light scattering) apparatus LS-8000 (Toso Kabushiki Kaisha; eluent: tetrahydrofuran; polystyrene standard).

(2) Grafting efficiency of polyester $^1$H-NMR analysis (220 MHz, solvent: CDCl$_3$/DMSO-d$_6$) of the product obtained by graft-polymerization is conducted by the use of UNITY 500 (Varian). Based on a change in strength of the signal of a proton from the double bond in polyester, the double bond being derived from a monomer having a double bond, the grafting efficiency is calculated from the following equation:

$$\text{Grafting efficiency of polyester (\%)} = \left(1 - \frac{\text{relative strength of the signal from the double bond in graft copolymer}}{\text{relative strength of the signal from the double bond in original polyester}}\right) \times 100$$

The relative strength is found by comparison with the strength of the internal standard signal.

(3) Weight average molecular weight of the side chain of graft copolymer

The graft copolymer is refluxed in a KOH/aqueous methanol solution, thereby performing hydrolysis of a polyester backbone in the copolymer. The hydrolyzate is extracted with THF under an acidic condition, and the resulting side chain polymer is re-precipitated from the extract using hexane, thereby purifying the side chain polymer. The molecular weight of the resultant polymer is measured by a GPC apparatus (Kabushiki Kaisha Shimadzu Seisakusho; eluent: tetrahydrofuran; polystyrene standard), based on which the weight average molecular weight of the grafted portion is calculated.

(4) Particle diameter of the aqueous dispersion

An aqueous dispersion having a solid content of 0.1 wt. % is prepared using only ion-exchange water, and the particle diameter is measured at a temperature of 20° C. by a laser light scattering particle diameter distribution meter (Coulter model N4, Coulter).

(5) Brookfield viscosity of the solution or dispersion

The viscosity of the aqueous solution or dispersion is measured at a temperature of 25° C. by a rotational viscometer (EM type, Tokyo Keiki Kabushiki Kaisha).

(6) Half-width of the signal of $^{13}$C-NMR

An aqueous dispersion is diluted with heavy water so as to have a solid content of 20 wt. %, and DSS is added to the diluted aqueous dispersion, thereby preparing a sample for measurement. $^{13}$C-NMR analysis (125 MHz) of the sample is conducted using UNITY 500, and Fourier transformation is performed without a weight function. The measurement conditions are previously adjusted so that the half-width of the signal of DSS is 5 Hz or less at a temperature of 25° C. From the resultant spectrum, the half-width of the signal of the carbonyl carbon derived from the polymer backbone and the half-width of the signal of the carbonyl carbon derived from the side chain polymer are determined.

(7) Glass transition point (Tg)

The aqueous solution or dispersion of a graft copolymer is applied to a glass plate and dried at a temperature of 170° C., thereby obtaining the graft copolymer in a solid state. Then, 10 mg of the obtained solid graft copolymer is put on a sample pan and scanned by differential scanning calorimetry at a rate of 10° C./min, thereby measuring the glass transition point.

(8) Peel strength

The peel strength of the sealant layer with respect to the other layers including the substrate of the layered polyamide film is measured by a 90° peel test using a peel tester at a peel rate of 100 mm/min. The measurement is performed in both a dry condition and a wet condition using a sample strip having a width of 15 mm. In the wet condition, water is dropped on the peeling interface; whereas no water is used in the dry condition.

(9) Peel strength in hot water

The peel strength of the sealant layer with respect to the other layers including the substrate of the layered polyamide film in hot water having a temperature of 90° C. is measured by a 90° peel test using a peel tester at a peel rate of 100 mm/min. Measurement is performed using a sample strip having a width of 15 mm.

EXAMPLE 1

(Preparation of a graft copolymer)

A stainless steel autoclave equipped with a stirrer, a thermometer, and a partial reflux condenser was charged with 543 parts of dimethylterephthalate, 458 parts of neopentylglycol, 410 parts of ethyleneglycol, and 0.52 parts of tetra-n-butyltitanate; and transesterification was performed at about 160° C. to 220° C. for 4 hours. After 29 parts of fumaric acid and 51 parts of sebacic acid were added, the temperature was raised to a level in the range of 200° C. to 220° C. over 1 hour, and thus, esterification was performed. Then, the temperature was raised to 255° C., and the pressure of the reaction system was gradually reduced. After that, the reaction mixture was allowed to react under a pressure of 0.2 mmHg for 1.5 hours while being stirred, thereby obtaining a polyester. The resultant polyester was pale yellow and transparent, and had a glass transition point of −10° C. and a weight average molecular weight of 12,000. The components of the polyester measured by NMR and the like were as follows.

TABLE 1

| Dicarboxylic acid components | |
|---|---|
| Telephthalic acid | 56 mol % |
| Sebacic acid | 40 mol % |
| Fumaric acid | 4 mol % |
| Diol components | |
| Neopentylglycol | 50 mol % |
| Ethyleneglycol | 50 mol % |

Next, a reactor equipped with a stirrer, a thermometer, a reflux apparatus, and a quantitative dropping funnel is charged with 75 parts of the resultant polyester, 56 parts of methyl ethyl ketone, and 19 parts of isopropylalcohol; and heated at about 65° C. and stirred, thereby dissolving the polyester. After the polyester was completely dissolved, a solution obtained by dissolving a mixture of 17.5 parts of methacrylic acid and 7.5 parts of ethyl acrylate, and 1.2 parts of azobis dimethylvaleronitrile in 25 parts of methyl ethyl ketone was dropped into the polyester solution at a rate of 0.2 ml/min. After the dropping was completed, the solution was stirred for 2 more hours. After 5 g of the reaction mixture was sampled, 300 parts of water and 25 parts of triethylamine were added to the sampled reaction mixture and stirred for 1 hour. Then, the temperature of the resultant dispersion was raised to about 100° C., and methyl ethyl ketone, isopropylalcohol and an excessive amount of triethylamine were removed by distillation. In this manner, a dispersion of the graft copolymer was prepared.

The resultant dispersion was white and had particles with a mean diameter of 200 nm. The Brookfield viscosity thereof at 25° C. was 90 cps. After the 1.25 g of heavy water was added to 5 g of this dispersion so as to have the solid content of 20 wt %, DSS was added and $^{13}$C-NMR analysis (125 MHz) was conducted. The half-width of the signal (160 to 175 ppm) of the carbonyl carbon of the polyester backbone was ∞ (no signal was detected), and the half-width of the signal (181 to 186 ppm) of the carbonyl carbon of the methacrylic acid side chain was 110 Hz. When the reaction was completed, a sampled reaction mixture was dried at about 100° C. for 8 hours in vacuo to obtain a graft copolymer in a solid state. The acid value of the graft copolymer, the grafting efficiency of the polyester which is measured by the use of NMR, and the molecular weight of the side chain polymer were measured. The molecular weight of the side chain polymer was measured after the hydrolysis of the graft copolymer. The acid value was 2,300 ep./$10^6$ g. Since a signal (δ=6.8–6.9 ppm; doublet) derived from the fumaric acid was not detected in the $^1$H-NMR analysis, it was confirmed that the grafting efficiency of the polyester was 100%. The weight average molecular weight of the side chain polymer was 10,000.

(Preparation of a layered polyamide film)

The above-obtained dispersion was diluted with water so as to have a solid content of 5% and applied to a biaxially drawn polyamide film having a thickness of 15 μm by a gravure coating method. The resultant film was dried at about 150° C., thereby obtaining a layered polyamide film including an adhesiveness-improving layer. The coating amount of the grafted polyester in the resultant film was 0.2 g/m².

Gravure ink, Lamiace 61 white (two-component type; Toyo Ink Kabushiki Kaisha) was printed on the adhesiveness-improving layer of the layered polyamide film, thereby forming a printing ink layer. Next, a one-component humidity curing-type anchor coat (AC) agent T-104 (Nihon Soda Kabushiki Kaisha) was applied to the printing ink layer, thereby forming an adhesive layer. Then, LDPE was laminated on the adhesive layer by a usual extrusion laminating process, thereby forming a sealant layer. The peel strength of the sealant layer was measured in the dry condition, in the wet condition, and in hot water at 90° C. by a 90° peel strength test performed at a peel rate of 100 mm/min. The results are shown in Table 6.

EXAMPLE 2

The dispersion obtained in Example 1 was diluted with water so as to have a solid content of 10%, thereby obtaining a coating liquid. Polyamide was melted at about 260° C. and extruded through a T-die of a screw-type extruder. Next, the resultant undrawn polyamide film was drawn to 3.2 times longer in a longitudinal direction by a cooling drum at about 50° C. The coating liquid was applied to the drawn polyamide film by a gravure coating method so that the coating amount is 4 g/m². Then, the coating liquid-applied polyamide film was dried so as to have a moisture ratio of 1%. The resultant film was drawn to 4 times wider in a width direction at about 120° C., and then thermally fixed at about 220° C. In this manner, a layered polyamide film, having a thickness of 15 μm, which includes an adhesiveness-improving layer was obtained. The coating amount of the grafted polyester was 0.2 g/m².

Then, as in Example 1, a printing ink layer, an adhesive layer, and a sealant layer were formed on the adhesiveness-improving layer. The peel strength of the sealant layer was measured in the dry condition, in the wet condition, and in hot water at 90° C. as in Example 1. The results are shown in Table 6.

EXAMPLE 3

In the same manner as in Example 1, a polyester having a composition shown in Table 2 was obtained. The glass transition point of the resultant polyester was −10° C.

TABLE 2

| Dicarboxylic acid components | |
|---|---|
| Telephthalic acid | 56 mol % |
| Sebacic acid | 40 mol % |
| Fumaric acid | 4 mol % |
| Diol components | |
| Neopentylglycol | 50 mol % |
| Ethyleneglycol | 50 mol % |

Using such a polyester, a dispersion of the graft copolymer was obtained in the same manner as in Example 1. The resultant dispersion was white and had particles with a mean diameter of 150 nm. The Brookfield viscosity thereof at about 25° C. was 100 cps. Using this dispersion, a layered polyamide film including an adhesiveness-improving layer was obtained in the same manner as in Example 1.

Then, as in Example 1, a printing ink layer, an adhesive layer, and a sealant layer were formed on the adhesiveness-improving layer. The peel strength of the sealant layer was measured in the dry condition, in the wet condition, and in hot water at 90° C. as in Example 1. The results are shown in Table 6.

EXAMPLE 4

Using the dispersion obtained in Example 3, a layered polyamide film including an adhesiveness-improving layer was obtained in the same manner as in Example 2.

Then, as in Example 1, a printing ink layer, an adhesive layer, and a sealant layer were formed on the adhesiveness-improving layer. The peel strength of the sealant layer was measured in the dry condition, in the wet condition, and in hot water at 90° C. as in Example 1. The results are shown in Table 6.

EXAMPLE 5

In the same manner as in Example 1, a polyester having the composition shown in Table 3 was obtained. The glass transition point of the resultant polyester was 30° C.

TABLE 3

| Dicarboxylic acid components | |
| --- | --- |
| Telephthalic acid | 56 mol % |
| Isophthalic acid | 39 mol % |
| Sebacic acid | 9 mol % |
| Fumaric acid | 4 mol % |
| Diol components | |
| Neopentylglycol | 50 mol % |
| Ethyleneglycol | 50 mol % |

Using such a polyester, a dispersion of the graft copolymer was prepared in the same manner as in Example 1. The resultant dispersion was white and had particles with a mean diameter of 150 nm. The Brookfield viscosity thereof at 25° C. was 100 cps. Using this dispersion, a layered polyamide film including an adhesiveness-improving layer was produced as in the same manner as in Example 1.

Then, as in Example 1, a printing ink layer, an adhesive layer, and a sealant layer were formed on the adhesiveness-improving layer. The peel strength of the sealant layer was measured in the dry condition, in the wet condition, and in hot water at 90° C. as in Example 1. The results are shown in Table 6.

Comparative Example 1

In the same manner as in Example 1, a polyester having the composition shown in Table 4 was obtained.

TABLE 4

| Dicarboxylic acid components | |
| --- | --- |
| Telephthalic acid | 35 mol % |
| Isophthalic acid | 35 mol % |
| Fumaric acid | 30 mol % |
| Diol components | |
| Neopentylglycol | 50 mol % |
| Ethyleneglycol | 50 mol % |

Such a polyester was dissolved in methyl ethyl ketone so as to have a solid content of 5%, thereby preparing an aqueous dispersion of the polyester. The resultant dispersion was white and had particles with a mean diameter of 1,000 nm. The Brookfield viscosity thereof at 25° C. was 50 cps. The glass transition point of the dispersion was 56° C. Using this dispersion, a layered polyamide film was obtained in the same manner as in Example 1. Then, as in Example 1, a printing ink layer, an adhesive layer, and a sealant layer were formed thereon. The peel strength of the sealant layer was measured in the dry condition, in the wet condition, and in hot water at 90° C. as in Example 1. The results are shown in Table 6.

Comparative Example 2

A surface of a biaxially drawn polyamide film having a thickness of 15 μm was subjected to corona treatment so as to have a surface tension of 53 dynes/cm. Gravure ink Lamiace 61 white (two-component type, Toyo Ink Kabushiki Kaisha) was printed on the corona-treated surface of the polyamide film, thereby forming a printing ink layer. Next, a one-component humidity curing-type AC agent T-104 (Nihon Soda Kabushiki Kaisha) was applied to the printing ink layer, thereby forming an adhesive layer. Then, LDPE was laminated on the adhesive layer by an usual extrusion laminating process, thereby forming a sealant layer. The peel strength of the sealant layer was measured in the dry condition, in the wet condition, and in hot water at 90° C. as in Example 1. The results are shown in Table 6.

Comparative Example 3

(Preparation of an aqueous dispersion of a copolyester)

A stainless steel autoclave equipped with a stirrer, a thermometer, and a partial reflux condenser was charged with 388 parts of adipic acid, 339 parts of isophthalic acid, 85 parts of maleic anhydride, 112 parts of benzoic acid, 90 parts of dimethylpropionic acid, 692 parts of neopentylglycol, 77 parts of water, and 1.5 parts of dibutyltin oxide; and esterification was performed at about 150° C. for 1.5 hours and at about 190° C. to 220° C. for 4 hours, thereby obtaining a polyester. The resultant polyester was pale yellow and transparent, and had a glass transition point of 60° C. and a weight average molecular weight of 1,200. The composition of the polyester obtained by NMR and the like was as follows.

TABLE 5

| Dicarboxylic acid components | |
| --- | --- |
| Adipic acid | 38 mol % |
| Isophthalic acid | 33 mol % |
| Maleic anhydride | 8 mol % |
| Benzoic acid | 11 mol % |
| Dimethylpropionic acid | 10 mol % |
| Diol components | |
| Neopentylglycol | 100 mol % |

Using such a polyester, graft polymerization was conducted and a dispersion containing a graft copolymer was obtained in the same manner as in Example 1. The resultant dispersion was white and had particles with a mean diameter of 300 nm. The Brookfield viscosity thereof at 25° C. was 100 cps or more (impossible to measure due to the excessively high level of viscosity). After 1.25 g of heavy water was added to 5 g of this dispersion to adjust the solid content to be 20 wt %, DSS was added and $^{13}$C-NMR analysis (125 MHz) was conducted. The half-width of the signal of the carbonyl carbon of the polyester backbone was 150 Hz, and the half-width of the signal of the carbonyl carbon of the methacrylic acid side chain was 200 Hz.

(Preparation of a layered polyamide film)

Using the above-obtained dispersion, a layered polyamide film was obtained in the same manner as in Example 1. Furthermore, a printing ink layer, an adhesive layer, and a sealant layer were formed thereon. The peel strength of the sealant layer was measured in the dry condition, in the wet condition, and in hot water at 90° C. as in Example 1. The results are shown in Table 6.

TABLE 6

| Sample | Peel strength (g/15 mm) | | |
| --- | --- | --- | --- |
| | Dry condition | Wet condition | In hot water (90° C.) |
| Example 1 | 610 | 500 | 200 |
| Example 2 | 700 | 550 | 250 |
| Example 3 | 830 | 610 | 300 |
| Example 4 | 850 | 680 | 350 |
| Example 5 | 720 | 560 | 250 |
| Comparative example 1 | 350 | 200 | 90 |
| Comparative example 2 | 350 | 190 | 75 |
| Comparative example 3 | 340 | 190 | 70 |

According to the present invention, a layered polyamide film having a sufficiently high adhesiveness and a method for producing the same are provided. The layered polyamide film according to the present invention includes an adhesiveness-improving layer and thus has a sufficiently high adhesiveness especially with a sealant layer which is laminated by, for example, a dry laminating process or an extrusion laminating process. A layered polyamide film according to the present invention can further include a sealant layer and the like formed above the adhesiveness-improving layer. The layered polyamide film has a sufficiently high adhesiveness between the layers, and maintains such a high adhesiveness even in a wet environment. A layered polyamide film according to the present invention which is used as a packaging bag is resistant against delamination between the layers caused by soaking water even if the bag is treated with boiling or retorting, and thus is difficult to break. Due to such a property, the layered polyamide film according to the present invention is suitable for a packaging bag of a moisture-containing food, medicine, or the like.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A layered polyamide film, comprising:

a polyamide substrate; and an adhesiveness-improving layer provided on at least one surface of the polyamide substrate, wherein the adhesiveness-improving layer includes a graft copolymer of a polyester and an acrylic polymer, and wherein the graft copolymer has a glass transition temperature of about 30° C. or less.

2. A layered polyamide film according to claim 1, further comprising a printing ink layer, an adhesive layer, and a sealant layer sequentially laminated on the adhesiveness-improving layer.

3. A method for producing a layered polyamide film including a polyamide substrate, and an adhesiveness-improving layer provided on at least one surface of the polyamide substrate, the adhesiveness-improving layer including a graft copolymer of a polyester and an acrylic polymer, the method comprising the step of:

applying an aqueous dispersion of the graft copolymer of the polyester and acrylic polymer to at least one surface of the polyamide substrate, wherein the graft copolymer has a glass transition temperature of about 30° C. or less and the graft copolymer in the aqueous dispersion has a mean particle diameter of about 500 nm or less, and a half-width of signal of a carbonyl carbon in the polyester chain in the particles of the graft copolymer in the aqueous dispersion measured using $^{13}$C-NMR spectrum is about 300 Hz or more.

4. A layered polyamide film, comprising:

a polyamide substrate; and an adhesiveness-improving layer provided on at least one surface of the polyamide substrate, wherein the adhesiveness-improving layer includes a graft copolymer of a polyester and an acrylic polymer, wherein the graft copolymer has a glass transition temperature of about 30° C. or less, and wherein the layered polyamide film is obtained by a process of, applying an aqueous dispersion of the graft copolymer of the polyester and acrylic polymer to at least one surface of the polyamide substrate which has been drawn in longitudinal direction, and drawing the resultant coated polyamide substrate in a width direction.

5. A method for producing a layered polyamide film including a polyamide substrate, and an adhesiveness-improving layer provided on at least one surface of the polyamide substrate, the adhesiveness-improving layer including a graft copolymer of a polyester and an acrylic polymer, the method comprising the steps of:

applying an aqueous dispersion of the graft copolymer of the polyester and acrylic polymer to at least one surface of the polyamide substrate which has been drawn in longitudinal direction, and drawing the resultant coated polyamide substrate in a width direction, wherein the graft copolymer has a glass transition temperature of about 30° C. or less, and the graft copolymer in the aqueous dispersion has a mean particle diameter of about 500 nm or less, and half-width of signal of a carbonyl carbon in the polyester chain in the particles of the graft copolymer in the aqueous dispersion measured using $^{13}$C-NMR spectrum is about 300 Hz or more.

* * * * *